Aug. 20, 1940.　　　C. J. WILSON　　　2,211,874

TURBINE JOINT SEAL STRUCTURE

Filed Aug. 16, 1938

WITNESSES:

INVENTOR
CLAUDE J. WILSON.
BY
ATTORNEY

Patented Aug. 20, 1940

2,211,874

UNITED STATES PATENT OFFICE 2,211,874

TURBINE JOINT SEAL STRUCTURE

Claude J. Wilson, Holmes, Pa., assignor to Westinghouse Electric & Manufacturing Company, East Pittsburgh, Pa., a corporation of Pennsylvania Application August 16, 1938, Serial No. 225,093

4 Claims. (Cl. 253—69)

My invention relates to an elastic fluid turbine, more particularly to the casing or stationary structure thereof, and it has for its object to provide improved joint structure therefor.

A further object of my invention is to provide a turbine having a casing joint formed with one or more grooves supplied with fluid at pressures between the interior or highest and the outside or atmospheric pressure so that, instead of the joint having a single land subject to the total pressure drop, the latter will be divided over the multiplicity of lands provided by the groove or grooves with the result that leakage of motive fluid through the joints of the casing to the atmosphere is prevented, the number and size of bolts required to secure the casing parts together is reduced, the precision or nicety of manufacturing operations in the preparation of the mating surfaces of the joint is decreased, and the amount of erosion due to leakage at the joints is rendered negligible.

Figure 1:
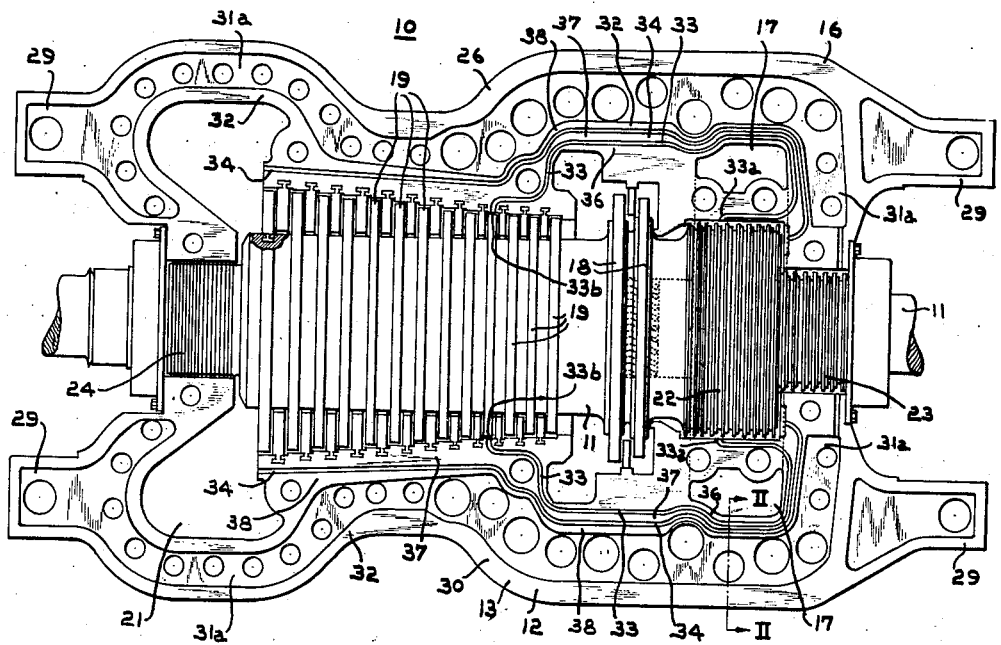
Figure 2:
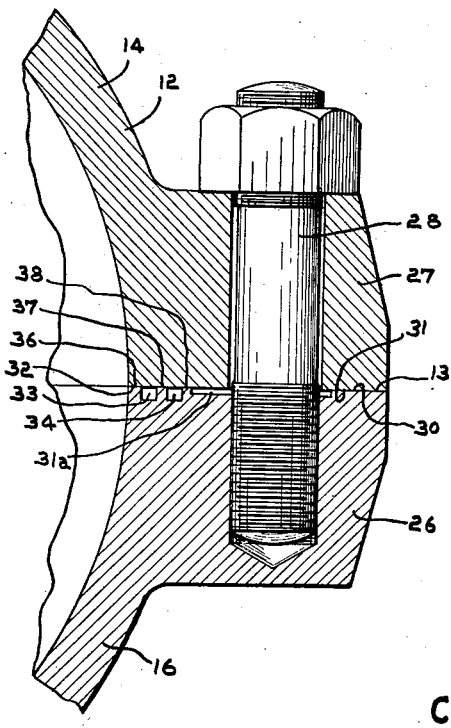

These and other objects are effected by my invention as will be apparent from the following description and claims taken in accordance with the accompanying drawing, forming a part of this application, in which:

Fig. 1 is a top plan view of a turbine cylinder base constructed in accordance with the present invention; and, Fig. 2 is an enlarged, fragmentary sectional view taken on the line II—II of Fig. 1, with the cylinder cover applied to the base.

In high-pressure steam turbine, it is now common practice to scrape or lap the joint so that the seam actually resisting leakage is composed of one land held tightly together with its mating surface by bolting. The pressure drop across this single land equals the total steam pressure (gauge reading) inside the turbine cylinder. Due to this high pressure drop it has been found difficult to manufacture a leak-proof joint.

Referring now to the drawing more in detail, the invention is shown as applied to a high-pressure turbine of the combined impulse reaction type. The turbine exhausts at a pressure above that of atmospheric pressure, for example, 250# per square inch and receives motive fluid at a pressure of, for example, 1250# per square inch.

There is shown, at 10, a high-pressure turbine comprised by a rotor 11 enclosed by a casing 12. The casing is divided along the horizontal plane 13 into two parts, an upper portion or cover 14 and a lower portion or base 16. Both the cover and the base are provided with a steam inlet nozzle chamber 17 for the admission of steam to impulse blading 18 from which it passes to the reaction blading 19. Both parts of the casing are also provided with an exhaust chamber 21 for the reception of steam leaving the reaction blading. In addition to the impulse and reaction blading above referred to, there is provided the usual dummy 22 and glands 23 and 24. Thus, there are provided what I term "expansion paths" between the casing and the rotor and extending axially from the nozzle chamber 17 in opposite directions; one expansion path being constituted by the space between the blades and the other by the space between the dummy and the casing.

The base 16 and cover 14 are provided with horizontal flanges 26 and 27, respectively, maintained in sealing relation by bolts 28. The horizontal flanges are provided with longitudially-extending lugs 29 for supporting the stationary casing structure.

The flanges 26 and 27 are provided with mating surfaces 30 and 31, respectively, providing the joint at the plane 13. One of these surfaces is formed with a relieved portion or groove 31a providing a sealing land arrangement 32.

The land arrangement 32, instead of being constituted by a single land, includts a plurality thereof formed by grovoes extending longitudinally between the inner and outer margins. In the construction herein illustrated, grooves 33 and 34 are shown, providing spaced sealing lands 36, 37 and 38. The innermost groove 33 connects at opposite ends with the dummy chamber at 33a and with the reaction chamber at 33b, the points 33a and 33b being where the pressure is approximately 750# per square inch with said admission pressure of 1250#. The outer groove 34 connects, at one end, with the outer end of the dummy chamber, and, at the other end, with the exhaust chamber 21, at points where the pressure is 250# per square inch.

With this arrangement, the land 36 seals against a drop in pressure from 1250# per square inch to 750# per square inch, a total pressure drop of 500#. Similarly, the land 37 seals against a drop from 750# per square inch to the exhaust pressure of 250# per square inch, a pressure drop of 500#. The outermost land, at 38, seals against only the presure drop from exhaust pressure of 250# per square inch to atmospheric pressure.

It will be seen that this arrangement permits a lower joint bearing pressure and, hence, less trouble over a given period of time. A joint to withstand #500 per square inch requires much less accuracy of fit than one for a substantially higher pressure. By dividing the total pressure drop over the lands, it is only necessary that each of the latter shall seal against the difference in pressure thereacross.

The use of the pressure grooves assures that, in the case of a leak, instead of the full pressure difference being available to cause flow, the chances are that only a part threeof, or the pressure across a single land, will be available, whereby not only will leakage be substantially reduced, but erosion as well. In the construction herein illustrated, the maximum pressure drop is reduced from 1250# per square inch to a maximum of 500# per square inch.

While the pressure grooves as herein illustrated join the dummy chamber in one end to an equal pressure zone in the reaction chamber or in the exhaust chamber, such construction is not imperative since the grooves may communicate with only one of these chambers. For completely encircling the high-pressure areas, however, and to facilitate dummy leak-off, it is desirable to have the grooves as shown.

For the sake of clearness only two grooves have been herein illustrated. However, it will be apparent that a greater number of such grooves may be used. For example, if four grooves were used to divide equally the total pressure drop from 1250# to atmospheric, each land would seal against a maximum pressure drop of only 250# per square inch.

With the pressures against which the joints have to seal materially reduced, it is possible to effect a corresponding reduction in the number or size of bolts used to hold together the flanges in sealing relation. Furthermore, the precision, or nicety, of manufacturing operations in the preparation of the mating surfaces of the joint can be decreased. Where the surfacing of a turbine joint to secure a perfect seal requires several hundred hours of labor, any such decrease in the nicety or precision required will constitute a material saving in time and cost.

While I have shown my invention in but one form, it will be obvious to those skilled in the art that it is not so limited but is susceptible of various changes and modifications without departing from the spirit thereof, and I desire, therefore, that only such limitations shall be placed thereupon as are imposed by the prior art or, as are specifically set forth in the appended claims.

What I claim is:

1. In an elastic-fluid turbine adapted to receive motive fluid under high pressure and including a casing and a rotor therein, said casing having a nozzle chamber for the admission of motive fluid to the interior of the casing; means providing expansion paths between the casing and the rotor and extending axially in opposite directions from said nozzle chamber, said casing being divided into a plurality of parts having meeting surfaces providing a joint, one of said parts having a plurality of grooves open to its surface and extending longitudinally of and between the inner and outer margins of the joint formed by said surfaces, each of said grooves communicating with a pair of regions of equal pressure in the expansion paths at opposite sides of the nozzle chamber, the pressure in the grooves, considered in a direction from the interior to the exterior of the joint, being successively lower.

2. In an elastic-fluid turbine, a casing, a rotor in said casing, means providing a high-pressure expansion stage intermediately of the length thereof, said casing and rotor defining a discharge space extending from either side of the high-pressure stage, means providing expansion paths between the casing and the rotor and extending axially in opposite directions from said discharge space; said casing being divided into a plurality of parts having meeting surfaces providing a joint and one of said parts having a plurality of grooves of different lengths, open to its surface, and extending longitudinally of the casing so as to overlap the high-pressure stage and its discharge space; said grooves communicating, respectively, with different pressure zones in one of said paths of expansion and being arranged so that the overlapping portions have successively lower pressures considered in a direction from the interior to the exterior of the casing.

3. In an elastic-fluid turbine, a casing, a rotor in the casing, said casing having a chamber for the admission of motive fluid to the interior thereof, means providing expansion paths for the fluid between the casing and the rotor and extending in opposite directions from said chamber, said casing being divided into a plurality of parts having meeting surfaces providing a joint, one of said parts having a plurality of grooves of different lengths open to its surface and extending longitudinally of and between the inner and outer margins of the joint formed by said surfaces; said grooves communicating with zones of approximately like pressures in the paths of motive fluid and being arranged so as to have successively lower pressures considered in a direction from the interior to the exterior of the casing.

4. In an elastic-fluid turbine, a casing, a rotor in the casing, means providing oppositely directed axial flow expansion paths between the casing and the rotor; said casing having a chamber for the admission of motive fluid to the interior thereof, and being divided into a plurality of parts having meeting surfaces providing a joint and one of said parts having a plurality of grooves of different lengths, open to its surface, and extending longitudinally of the casing so as to overlap the admission chamber; said grooves communicating, respectively, with different pressure zones in the paths of motive fluid expansion, each groove having its ends communicating with zones of approximately like pressures in the paths of expansion and being arranged so that the overlapping portions have successively lower pressures considered in a direction from the interior to the exterior of the casing.

CLAUDE J. WILSON.